(12) United States Patent
Dexter

(10) Patent No.: US 11,851,028 B2
(45) Date of Patent: Dec. 26, 2023

(54) VEHICLE SPACE UTILIZATION PLATFORM

(71) Applicant: Tim Dexter, Orland, CA (US)

(72) Inventor: Tim Dexter, Orland, CA (US)

( * ) Notice: Subject to any disclaimer, the term of this patent is extended or adjusted under 35 U.S.C. 154(b) by 205 days.

(21) Appl. No.: 17/551,991

(22) Filed: Dec. 15, 2021

(65) Prior Publication Data

US 2022/0297608 A1  Sep. 22, 2022

Related U.S. Application Data

(60) Provisional application No. 63/207,687, filed on Mar. 16, 2021.

(51) Int. Cl.
*B60R 7/02* (2006.01)
*B60R 7/08* (2006.01)

(52) U.S. Cl.
CPC . *B60R 7/02* (2013.01); *B60R 7/08* (2013.01)

(58) Field of Classification Search
CPC .................................. B60R 7/02; B60R 9/06
USPC ...................... 224/564, 558, 401; 108/44, 92
See application file for complete search history.

(56) References Cited

U.S. PATENT DOCUMENTS

| | | | | |
|---|---|---|---|---|
| 2,889,097 A * | 6/1959 | Broehl | ................. | B62D 47/003 296/37.16 |
| 2,899,162 A * | 8/1959 | Broehl | ..................... | B60N 3/18 248/140 |
| 3,015,530 A * | 1/1962 | Anderson | ................. | B25H 5/00 224/400 |
| D244,748 S * | 6/1977 | Canterbury | .................... | D8/380 |
| 4,247,030 A * | 1/1981 | Amacker | ................... | B60R 9/00 280/848 |
| 4,418,626 A * | 12/1983 | Semien | ................... | A47B 31/06 108/44 |
| 5,025,964 A * | 6/1991 | Phirippidis | ............... | B60R 7/02 224/42.33 |
| 5,443,019 A * | 8/1995 | Sheldrick | ................. | B25H 5/00 108/44 |
| 6,629,726 B2 * | 10/2003 | Johnston | ................ | B60N 3/102 297/188.06 |
| 6,799,706 B2 * | 10/2004 | Essig | ........................ | B60R 9/00 248/503 |
| 7,066,363 B2 * | 6/2006 | Lecoq | ....................... | B60N 3/10 224/558 |
| 7,131,681 B2 * | 11/2006 | Kim | ......................... | B60R 7/02 296/37.16 |
| 8,939,335 B2 * | 1/2015 | Setina | ....................... | B60R 5/04 224/539 |

(Continued)

*Primary Examiner* — Justin M Larson
(74) *Attorney, Agent, or Firm* — Apex Juris, pllc; R. Lynette Wylie

(57) ABSTRACT

A vehicle space utilization platform including a cargo tray having a substantially planar surface framed by opposed front and a rear members adjoined between opposed side members, a pair of side platforms with side platforms having pair of side edges affixed at least a portion of the pair of side members and the other of the side edges having a fastener mount for attachment to a side panel of a vehicle interior and an upper tier having one or more mounting members affixed to the side platforms, and a lower tier perpendicularly disposed on a vertical panel having stacked apertures and an upwardly disposed stay flange configured to enable keeping a corresponding container on the lower tier.

20 Claims, 7 Drawing Sheets

(56) References Cited

U.S. PATENT DOCUMENTS

| | | | | |
|---|---|---|---|---|
| 8,978,948 | B2* | 3/2015 | Tujague | B60R 11/0258 224/564 |
| D899,346 | S * | 10/2020 | Morris | D12/412 |
| 11,155,218 | B2* | 10/2021 | Morris | B60R 11/06 |
| 2004/0079779 | A1* | 4/2004 | Essig | B60R 9/00 224/558 |
| 2004/0251288 | A1* | 12/2004 | Hancock | B60R 7/14 224/558 |
| 2009/0159540 | A1* | 6/2009 | Meeks | F41A 23/18 211/64 |
| 2022/0297608 | A1* | 9/2022 | Dexter | B60R 7/08 |

* cited by examiner

VEHICLE SPACE UTILIZATION PLATFORM

CROSS-REFERENCE TO RELATED APPLICATION

The present application claims the benefit of U.S. Provisional Application Ser. No. 63/207,687 filed on Mar. 16, 2021 entitled Transverse Cargo and Utility Platform For Vehicles.

FIELD OF THE INVENTION

The present invention relates to vehicle space utilization assemblies and more particularly to assemblies for organization and access to equipment and supplies in a rear cargo area behind seating in a vehicle.

BACKGROUND OF THE INVENTION

Traditionally, sport utility and off-road vehicles, vans and similar motor vehicles have a rear cargo area behind the seats that can be used for storage of articles, including tools, equipment and supplies. The open space is typically accessed by a rear door. Such items are often unsecured, disorganized, often stacked and prone to shifting when the vehicle is moving. Moreover, abrupt impacts caused by sharp turns and sudden stops may damage fragile and unsecured items.

Articles with rounded surfaces, particularly cylindrical articles, such as, for example, flashlights, fire extinguishers, pumps, and air compressors, are particularly prone to rolling around during transit. As a result, they may be buried or concealed under other articles or a seat.

A drawback of conventional systems for storing cargo in rear storage areas is the lack of adaptive mechanisms to place them in an accessible or convenient location and to fit or hold variously items of differing shapes and sizes. Due to the lack of an organization and management of items placed in the back storage area, stowed emergency equipment such as fire extinguishers, flashlights, tire replacement tools, compressed air cannisters may be buried or wedged and therefore inaccessible. Due to such shortcomings in known vehicle cargo management systems, items carried in rear storage areas of vehicles are often unsecured, disorganized and inaccessible.

A further disadvantage of existing vehicle space management systems is the lack of adaptive mechanisms to place them in an accessible or convenient location and to fit or hold variously articles of differing shapes and sizes. Moreover, unsecured articles are subject to potential damage due to movement induced by of sharp turns and sudden stops.

Existing storage systems include inserts with compartments, containers and platforms to facilitate organization of articles on, in or on tow accessory for a vehicle. Known storage containers and organizers lack components and features for facilitating secure yet accessible stowage of articles of articles during transit. A problem with conventional vehicle organization assemblies is the lack of provision for ready access to emergency equipment and supplies, particularly those cylindrical shape such as, for example, flashlights, fire extinguishers, and air compressors.

Due to the lack of an organization and management of articles placed in the back storage area, stowed emergency equipment such as fire extinguishers, flashlights, tire replacement tools, compressed air canisters may be hidden or wedged and therefore inaccessible.

Thus, there persists a need for a facile and adaptive rear stowage management system for securing, organizing and accessing a variety of articles in the rear cargo area of a vehicle that facilitates organization of a range of everyday, recreational and emergency activities, and provides ready access to emergency equipment and supplies.

SUMMARY OF THE INVENTION

The present space utilization platform provides a modular platform and retaining system for organization and storage of cargo, facilitating ready access to emergency and other equipment and supplies in a rear cargo area. In particular, this space utilization assembly provides a platform including a cargo tray having a substantially planar surface framed by opposed front and a rear members adjoined between opposed side members, a pair of side platforms with side platforms having pair of side edges affixed at least a portion of the pair of side members and the other of the side edges having a fastener mount for attachment to a side panel of a vehicle interior and an upper tier having one or more mounting members affixed to the side platforms. one lower tier extending from a vertical panel affixed to at least one of the pair of side platforms, and a vertical panel with a lower tier perpendicularly adjoined from a bottom edge of the vertical panel in plane having an upwardly disposed stay flange and a corresponding container configured for fitted seating within on the lower tier.

According to the present invention, side platforms have surfaces adaptable for seated fitting or retaining of cargo and include, which may include apertures for anchoring retainer mechanisms. In some embodiments, the surfaces are planar and/or angle downwardly from a substantially rectangular cargo tray. Some embodiments feature side platforms with one or more upper tiers having a substantial horizontal plan. Side platforms and/or upper tiers may include apertures to anchor detachable retainers of one or more articles with mounting members. The apertures may be horizontally aligned slots for mounting of an article.

The side platforms may have at least one fastener mount for attachment to the vehicle interior, such as a side panel on or near a rear wheel well, that may include a hole for receiving a corresponding bolt tightened with a nut and washer.

In various embodiments, a cargo tray may be permanently or detachably mounted on the side platforms. Other embodiments may feature standalone side platforms having fastener mounts for attachment to a side panel of a vehicle interior. Such standalone side platforms having fastener mounts for attachment to a side panel of a vehicle interior and may be employed separate from a cargo tray. The side platforms may include an upper tiers affixed thereto. Side platforms and/or upper tiers may include apertures for detachable retaining of an article with mounting members.

In various embodiments, apertures may be provided, drilled or punched in the cargo tray, side platforms, upper tier or lower tier, as claimed and described herein. Other embodiments may feature a standalone space utilization platform including a cargo tray mounted on side platforms that may be readily removed from the vehicle interior without disassembly of a bolt or other fastener mechanism.

Some embodiments include a lower tier extending from a vertical panel affixed to the side platform. The vertical panel may be affixed to the side platforms or the cargo tray that may include a lower tier. Various embodiments feature vertical panels with apertures such as, for example, stacked elongate slots, for anchoring mounting mechanisms for attaching articles. In some embodiments, an upwardly disposed stay flange extends from an end of the lower tier opposing the inward angle. In various embodiments, a space defined by the vertical panel, lower tier and stay flange accommodates a container dimensioned for fitted correspondence with the space.

In embodiments such as described in detail below, the side platforms have planar surfaces angled downwardly from the substantially rectangular horizontal plane of the cargo tray. One or more upper tiers may be a substantially horizontal plane may be mounted on the side platforms. The side platforms have fastener mounts on their opposed side edges. The fastener mounts on for affixing one side to an interior panel of a vehicle. Opposing side edges may have fastener mounts such as, for example, fastener holes for affixing a cargo tray.

DETAILED DESCRIPTION OF THE VARIOUS EMBODIMENTS

Figure 1:
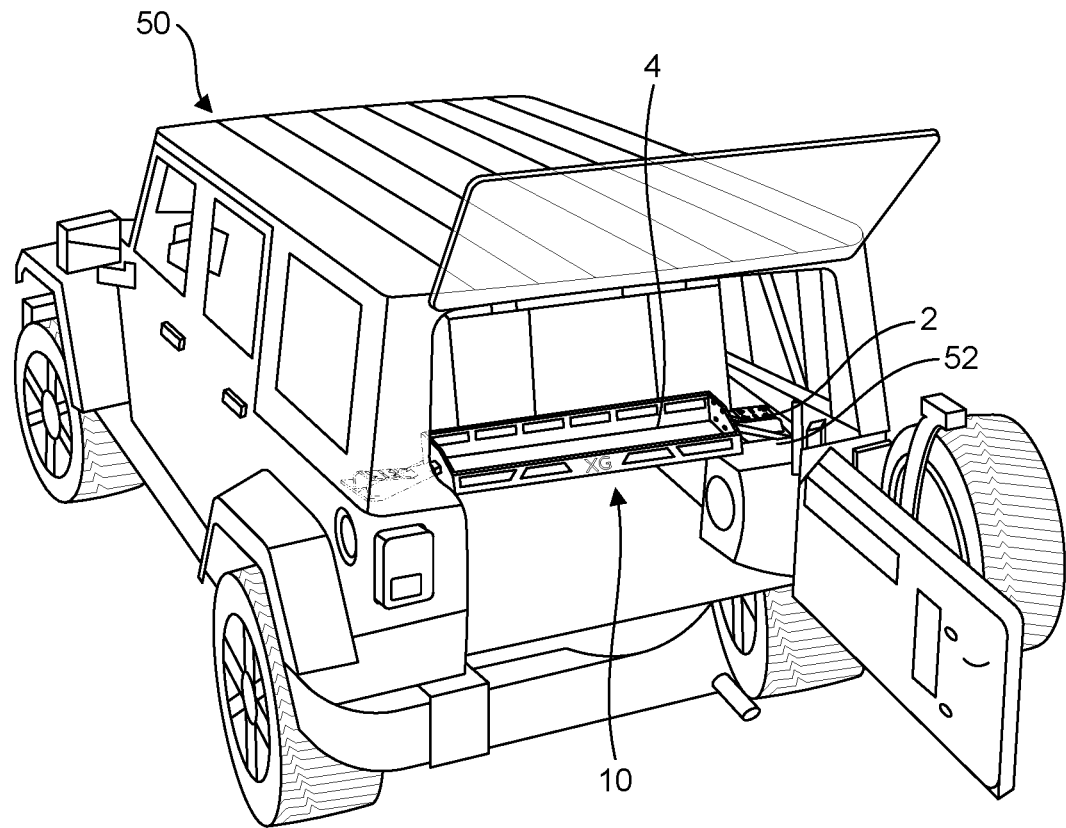
FIG. 1 is a perspective view of vehicle with an embodiment of the vehicle space utilization assembly according to the present invention installed in a sport utility vehicle.

The disclosed subject matter will become better understood through review of the following detailed description in conjunction with the figures. The detailed description and figures provide example embodiments of the invention described herein. Those skilled in the art will understand that the disclosed examples may be varied, modified, and altered without departing from the scope of the invention described herein.

Throughout the following detailed description, representative examples of features of the present cargo management system are disclosed to illustrate aspects of the claimed invention. Related features in the examples may be identical, similar, or dissimilar. The reader should understand that a given feature need not be the same or similar to the specific portrayal. It should therefore be understood that the representative embodiments illustrated in FIGS. 1-6 is adapted to an automobile and specifically a sport utility vehicle. However, it should be understood that the claimed and described features of other embodiments of the claimed invention may be adaptable to other applications, including, for example, storage containers, household containers, or any other storage and organizational articles.

All definitions, as used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used in the specification and in the claims, "or" is synonymous to "and/or" as defined above. For example, when separating articles in a list, "or" or "and/or" shall be interpreted as being inclusive, i.e., the inclusion of at least one, but also including more than one, of a number or list of elements, and, optionally, additional unlisted articles. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

All transitional phrases such as "comprising," "including," "carrying," "having," "containing," "involving," "relating to," "composed of," and the like are to be understood to be open-ended, i.e., to mean including but not limited to.

As used herein, "fastener" or "stay," refers to any suitable connective device or material such as, for example, a hook, clasp, strap, line, D-ring or carabiner, "hook-and-loop" strip or material, retainer clip dimensioned and configured for a corresponding article such as, for example, a cylindrical container or equipment, including but not limited to, a fire extinguisher, air compressor or pump, or magnetic engagement material with releasably fastenable or couplable component surfaces.

Referring to FIGS. 1-6 illustrating an embodiment of the present invention, space utilization assembly 10 includes a pair of side platforms 2 having an upper surface 12 disposed between opposed pair of side edges affixed by welds 3 to cargo tray 4 having a substantially planar horizontal surface framed by opposed front and rear members adjoined between a pair of opposed side members. Each of the side platforms 2 has side edges 14 affixed to at least a portion of the opposed side members of cargo tray 4.

Figure 2:
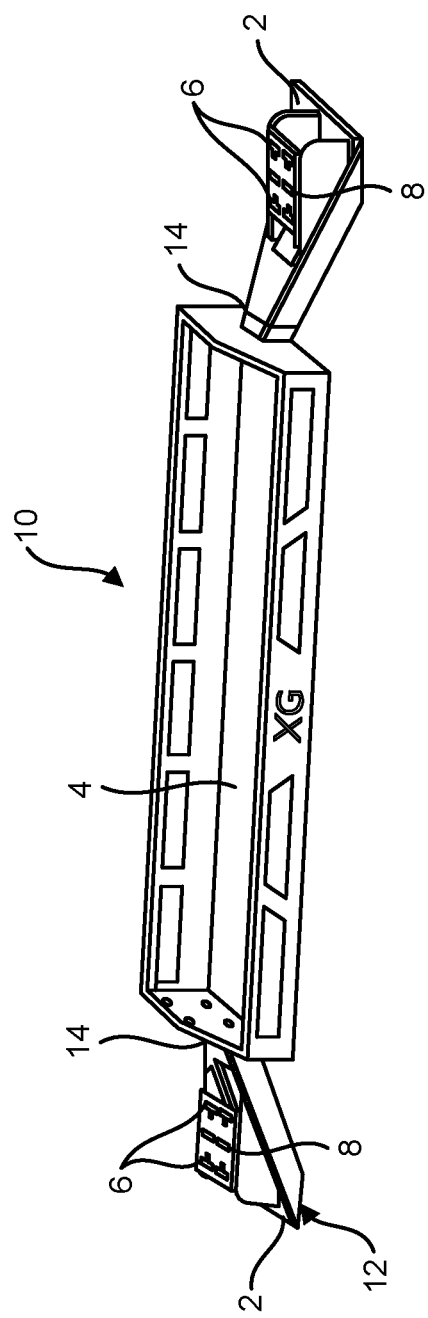
FIG. 2 is a perspective view of an embodiment of the vehicle space utilization assembly according to the present invention.
Figure 3:
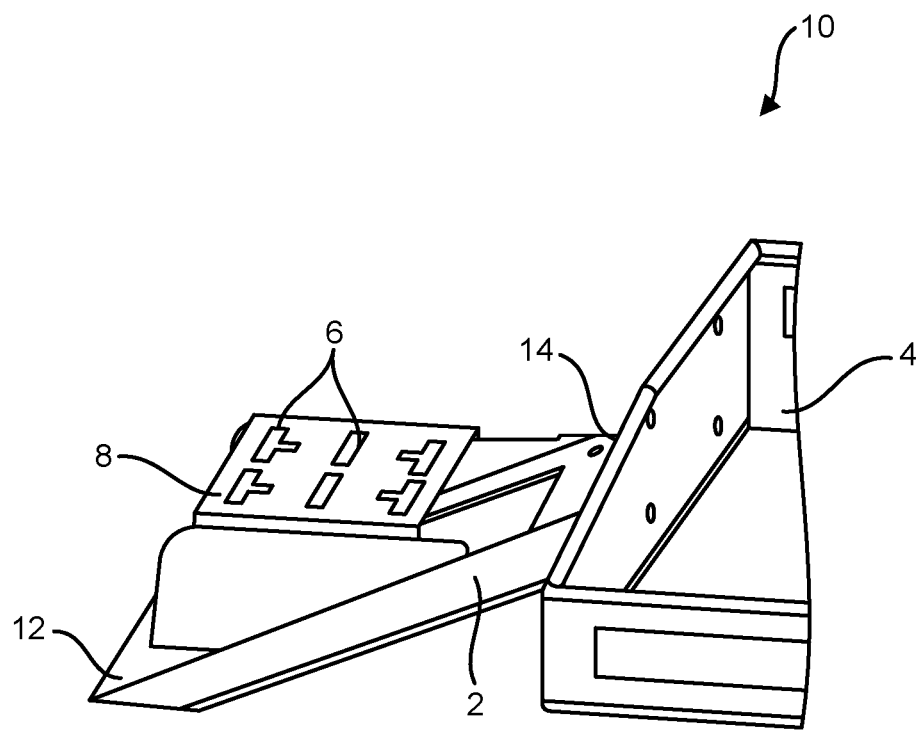
FIG. 3 is a close up view of the side platform of the embodiment if FIG. 2.

As best shown in FIGS. 2 and 3, side platforms 2 may include an upper tiers 8 affixed to upper surface 12. In the planar horizontal surface of upper tier 8 are one or more apertures 6 for anchoring at least one mounting member 16. Apertures 6 provide anchors for mounting members 16 configured to retain an article such as, for example, air compressor 20 and flashlight 22.

Figure 4:
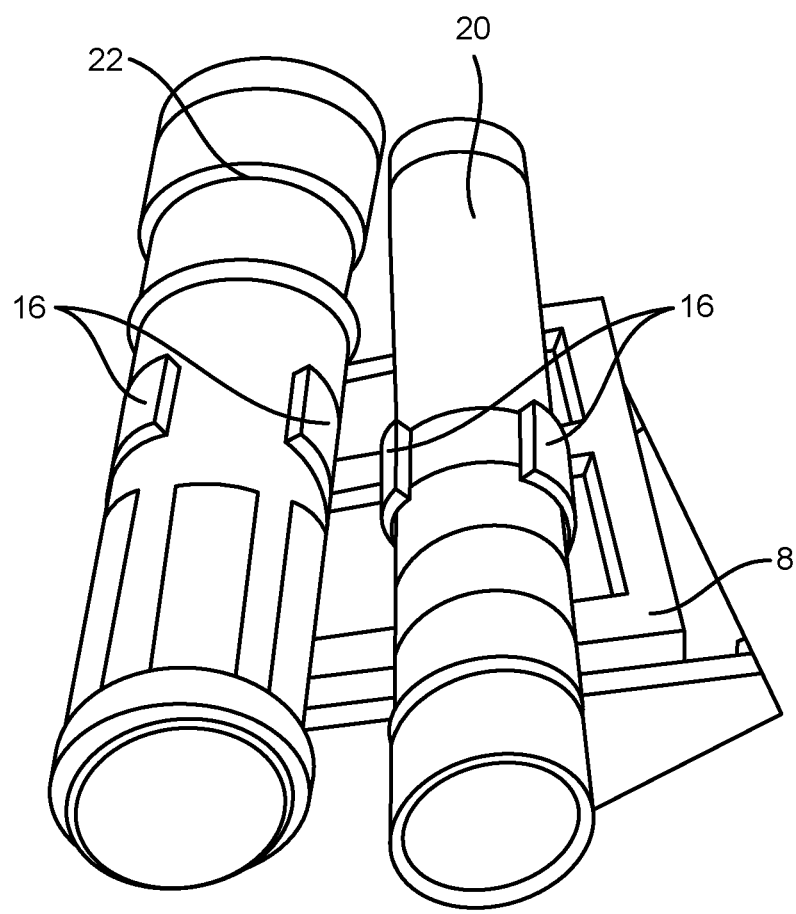
FIG. 4 is a close up of the side platform member when assembled and in use.

As shown in FIG. 4, mounting members 16 may be attached within or inserted through apertures 6 thereby anchoring mounting members 16 in the form of detachable rounded retainer bands whereon air compressor 20 and flashlight 22 are mounted.

Various fasteners may be employed for mounting members 18 provide optional mechanisms for attaching through apertures 6. For example, straps, bungies, clasps, and other suitable fasteners such as described and claimed herein may be employed to retain articles upon the upper tier 8. In the illustrated embodiment of FIG. 4, mounting member 6 is a rounded clip for mounting cylindrical articles.

Figure 5:
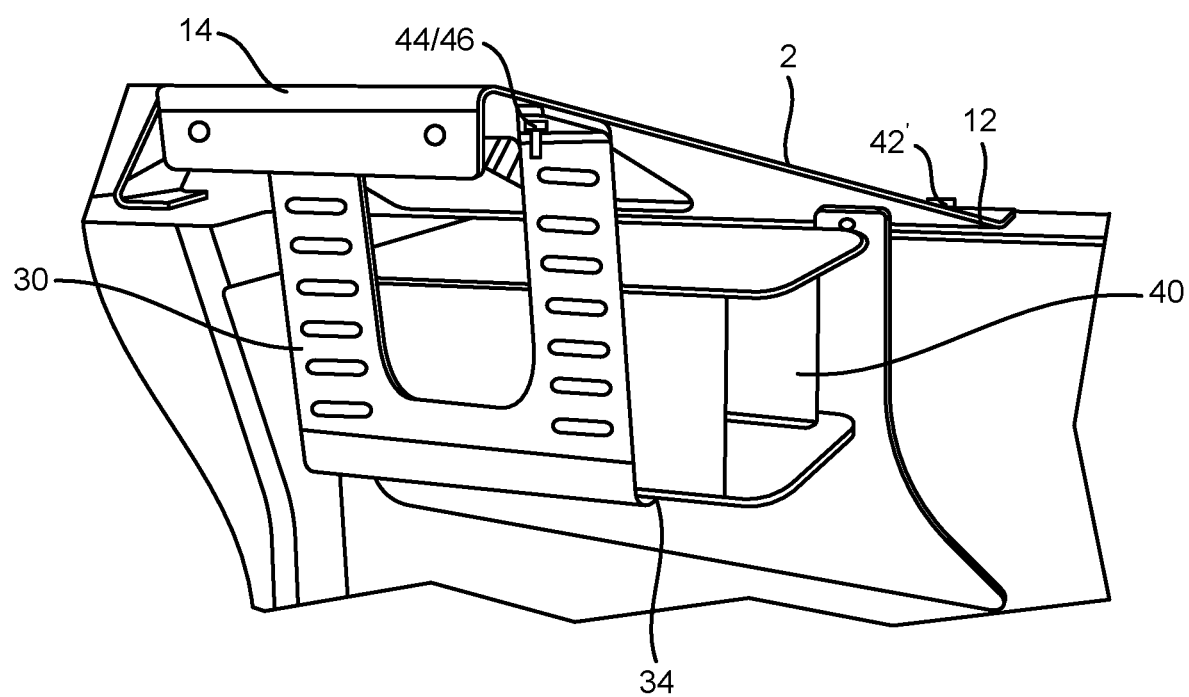
FIG. 5 is a close up view of an embodiment of the vehicle space utilization assembly with a vertical panel and lower tier.
Figure 6:
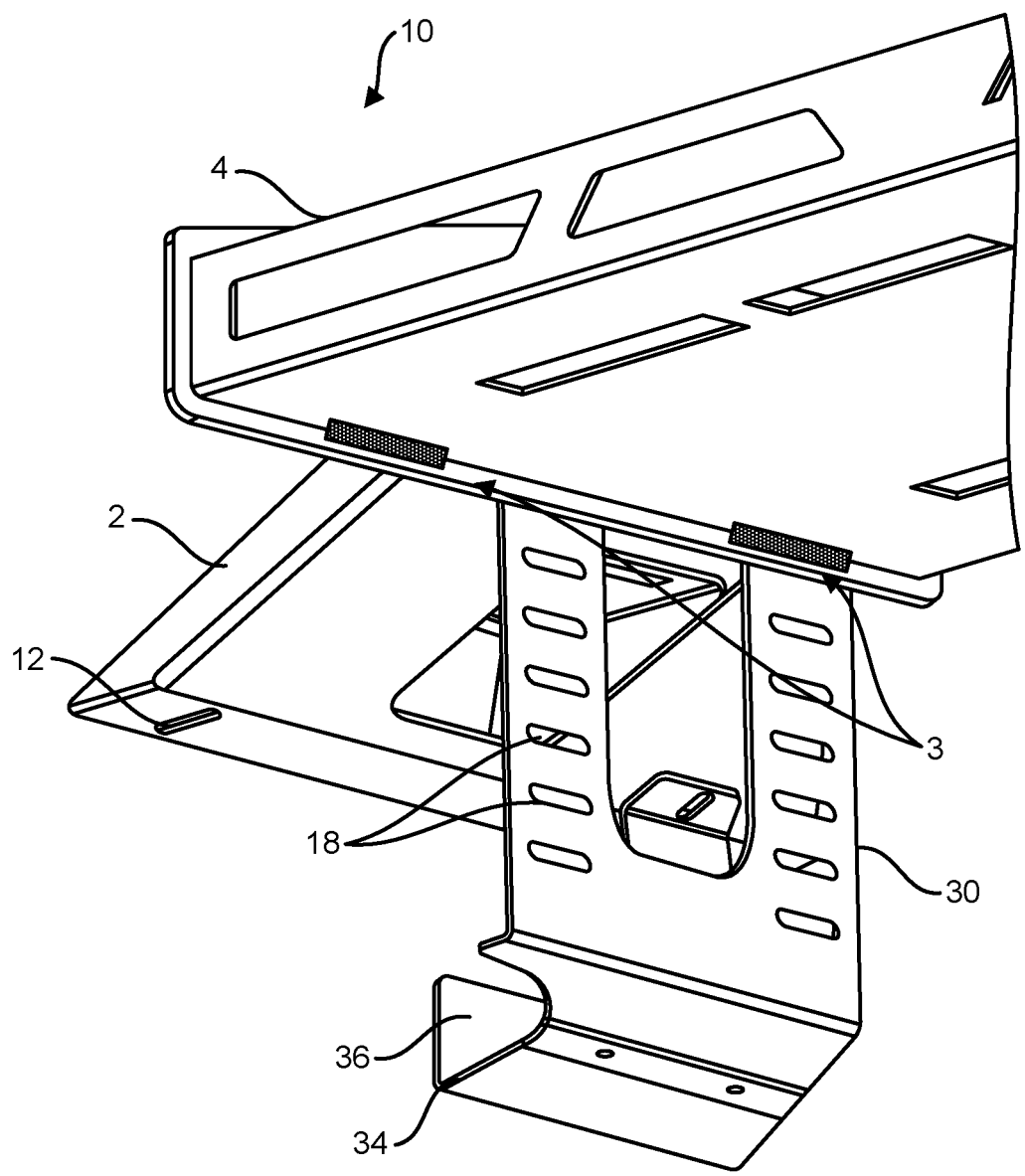
FIG. 6 is a close up view of the bottom compartment of FIG. 5 with a corresponding container on the lower tier.

Now referring to FIGS. 5 and 6, a further feature of the illustrated embodiment is a lower tier extending from a vertical panel 30 affixed to at least one of the pair of side platforms 2. As illustrated, vertical panel 30 has a plurality of apertures 18 that are stacked and vertically aligned slots. Lower tier 34 is perpendicularly adjoined from a bottom edge of the vertical panel 30 and has an upwardly disposed stay flange 36. Thus, in the illustrated embodiment, lower tier 34 provides a substantially horizontal plane extending from a vertical panel affixed to at least one of side platforms 2. In the space defined within vertical panel 30 and lower tier 34, container 40 is dimensioned for seated correspondence and is kept within the space defined within vertical panel 30 and lower tier 34 by stay flange 36.

In the illustrated embodiment, side platforms 2 are planar surfaces angled downwardly from side edges 14 affixed to opposed sides of the substantially rectangular cargo tray 4. Fastener mounts of the other of the side edges 12 may include at least one hole for receiving a corresponding bolt 42 for attachment to the vehicle interior side panel 52.

In various embodiments, cargo tray 4 may be permanently or detachably mounted on the side platforms 2. Some embodiments may feature standalone side platforms 2 having fastener mounts on side edges 12 for attachment to a vehicle interior side panel 52 of a vehicle interior. Side platforms 2, cargo tray 4, upper tier 8, vertical panel 30 and lower tier 34 may include apertures 6 for detachable retaining of an article such as, for example, air compressor 20 or flashlight 22 with mounting members 16.

Alternative configurations of the vehicle space utilization platform 10 exemplified by the illustrated embodiment in FIGS. 1-6 may include various structures and functionalities. For example, side platform 2, upper tiers 8, vertical panel 30 and lower tier 34 and/or mounting members 16 may be dimensioned and configured to accommodate variously sized and shaped articles or to fit dedicated equipment, tools or cargo. The modular and adaptive assembly employing the features and components may be provided in a single side platform 2 attached to a vehicle panel 52, or vehicle interiors side panels of asymmetrical shapes and sizes such that adapted space utilization assemblies are provided in various configurations incorporating modular components such as illustrated in FIGS. 1-6 that may not be symmetrically positioned.

Figure 7:
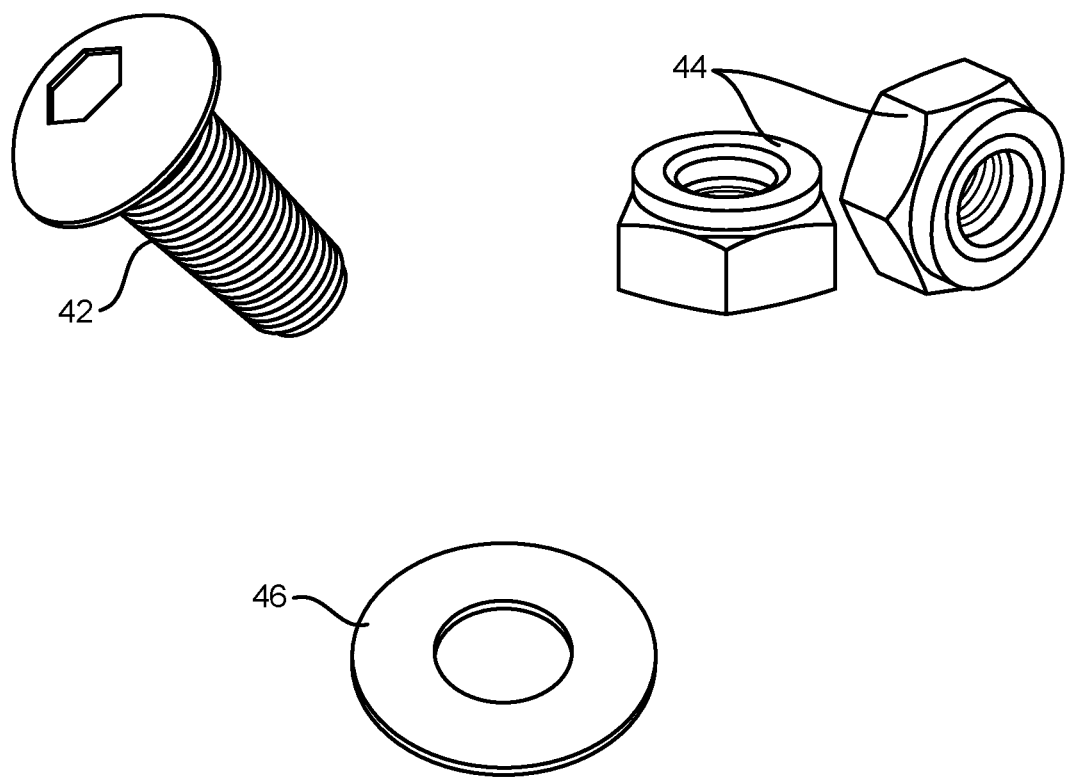
FIG. 7 is a close up view of the bolt, washer and nut used to affix the components of an embodiment of the vehicle space utilization assembly according to the present invention.

Now referring to FIG. 7, respective side edges 12 of side platforms 4 are fastened to vehicle side panel 52 by tightening bolt 42 and nut 44 with washer 46 therebetween. The latter fastener assembly 42/44/46 may also be employed to affix side edges 14 of side platforms 2 to cargo tray 4, and upper tier 8 and/or vertical panel 30 and lower tier 34 to side platform 2.

Components of the claimed and described invention including but not limited to side platforms 2, cargo tray 4, upper tier 8, vertical platform 30 and lower tier 34 may be comprised of any stable and durable material of sufficient rigidity to support articles placed thereon. Embodiments such as illustrated in FIGS. 1-6 are composed of steel. Alternative embodiments may employ steel, metal alloys, stainless steel, aluminum, carbon fiber, wood, molded thermoplastic or other suitable polymeric material.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific applications for which the inventive teachings are used.

Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article or material described herein.

The invention claimed is:

1. A vehicle space utilization platform, comprising:
   a cargo tray having a substantially rectangular surface framed by a front member and a rear member in opposed horizontal alignment with the front member, wherein the front member and the rear member are adjoined between a pair of side members; and
   a pair of side platforms wherein each of the side platforms has a pair of side edges affixed to at least a portion of the cargo tray and the other of the side edges includes one or more fastener mounts for attachment to a vehicle interior, wherein the pair of side platforms have upper surfaces angled downwardly from the substantially rectangular plane of the cargo tray when the vehicle space utilization platform is attached to the vehicle interior.

2. The vehicle space utilization platform of claim 1, further comprising at least one upper tier affixed to the upper surface of the side platforms, wherein the at least one upper tier has a substantially horizontal plane.

3. The vehicle space utilization platform of claim 2, wherein the at least one upper tier includes one or more apertures to anchor at least one mounting member for detachable retaining of an article.

4. The vehicle space utilization platform of claim 3, wherein the one or more apertures have at least one mounting member for retaining an article.

5. The vehicle space utilization platform of claim 4, wherein the at least one mounting member is configured to retain a cylindrical article.

6. The vehicle space utilization platform of claim 1, further comprising at least one lower tier extending from a vertical panel affixed to at least one of the pair of side platforms.

7. The vehicle space utilization platform of claim 6, wherein the vertical panel has a plurality of apertures.

8. The vehicle space utilization platform of claim 7, wherein the apertures are stacked, vertically aligned elongate slots.

9. The vehicle space utilization platform of claim 6, wherein the at least one lower tier is angled inwardly in a perpendicular direction and has an upwardly disposed stay flange.

10. The vehicle space utilization platform of claim 9, further comprising a container dimensioned for fitted correspondence within the space between the vertical panel, the lower tier and the stay flange.

11. The vehicle space utilization platform of claim 1, wherein the fastener mounts are at least one hole for receiving a corresponding bolt.

12. A vehicle space utilization platform, comprising:
a pair of side platforms wherein each of the side platforms has a planar upper surface between a pair of opposed side edges, wherein one of the opposed side edges includes a fastener mount for attachment to a side panel of a vehicle interior; and
at least one upper tier affixed to the planar upper surface, wherein the at least one upper tier has a substantially horizontal plane that includes a plurality of apertures for anchoring a mounting member for detachable retaining of an article when the vehicle space utilization platform.

13. The vehicle space utilization platform of claim 12, further comprising a cargo tray mounted to the side edges opposed to the fastener mounts.

14. The vehicle space utilization platform of claim 12, wherein the at least one mounting member of the at least one upper tier is configured to accommodate a cylindrical article.

15. The vehicle space utilization platform of claim 14, wherein the at least one mounting member has a rounded band.

16. The vehicle space utilization platform of claim 12, further comprising at least one lower tier extending from a vertical panel affixed to at least one of the pair of side platforms, wherein the vertical panel has a plurality of stacked, aligned slots, and wherein the at least one lower tier is perpendicularly adjoined from a bottom edge of the vertical panel and has a stay flange upwardly disposed from the lower tier.

17. The vehicle space utilization platform of claim 16, further comprising a container dimensioned for fitted correspondence within the space between the vertical panel, the lower tier and the stay flange.

18. A vehicle space utilization platform, comprising:
a side platform having an upper surface between a pair of side edges, wherein one of the side edges includes a fastener mount for attachment to an interior side panel, wherein the fastener mount is configured such that coupling of the fastener mount to the interior side panel positions the upper surface of the side platform in an upwardly angled direction when attached to the interior side panel; and
at least one upper tier affixed to the side platform, wherein the upper tier has a horizontal surface and includes a plurality of apertures for anchoring one or more mounting members.

19. The vehicle space utilization platform of claim 18, wherein the side platform has at least one of the one or more mounting members; wherein said at least one mounting member is configured to retain a cylindrical article.

20. The vehicle space utilization platform of claim 18, further comprising at least one lower tier extending from a vertical panel affixed to the side platform, wherein the vertical panel has a plurality of vertically aligned elongate slots, and wherein the at least one lower tier is perpendicularly adjoined from a bottom edge of the vertical panel and has a stay flange upwardly disposed from the lower tier.

* * * * *